United States Patent Office 3,558,572
Patented Jan. 26, 1971

3,558,572
PROCESS FOR POLYMERIZING BETA-LACTONES IN THE PRESENCE OF POLY(BETA-LACTONE) PREPOLYMER INITIATORS
Franciscus J. F. van der Plas and Willem M. Wagner, Amsterdam, Netherlands, assignors to Shell Oil Company, New York, N.Y., a corporation of Delaware
No Drawing. Filed Mar. 29, 1968, Ser. No. 717,394
Claims priority, application Great Britain, Apr. 14, 1967, 17,197/67
Int. Cl. C08g 17/017
U.S. Cl. 260—78.3
13 Claims

ABSTRACT OF THE DISCLOSURE

Poly(beta-lactones) are prepared by polymerizing one or more beta-lactones (beta-propiolactones) in a liquid hydrocarbon diluent having a boiling point below 300° C. in the presence of a solid carboxylic anion-containing initiator which is substantially insoluble in the diluent, is free of active hydrogen, and is prepared by reacting a beta-lactone with a nucleophilic agent as hereinafter more fully described such as the tertiary phosphines, stifines, arsines, in the molar ratio of beta-lactone to nucleophilic agent of 20:1 to 1:40.

BACKGROUND OF THE INVENTION

This invention relates to a process for the polymerization of one or more beta-propiolactones in a liquid hydrocarbon diluent in a slurry-type process, as well as to the polyesters thus obtained.

As used herein, "slurry polymerization" refers to a process in which the monomeric lactone is at least partly soluble in the liquid diluent under the polymerization conditions, i.e., to an amount of more than 10% by weight. The resulting polymeric lactone is substantially insoluble, i.e., to an amount of not more than 1% by weight causing its precipitation in and the "slurriness" of the polymerization mixture. Such slurry polymerization will result if, for example, a low-boiling hydrocarbon, such as heptane, is used as the diluent.

The use of low-boiling hydrocarbons in the polymerization of pivalolactone is known; however, such a process usually has a number of drawbacks, such as a low bulk density, e.g., 0.1, of the resulting polyester and a relatively high diluent/lactone ratio, e.g., 10:1, is required in order to ensure sufficient fluidity of the polymerization mixture.

It has further been found that by carrying out the polymerization in a suspension-type process in a high-boiling viscous hydrocarbon medium, wherein both monomer and polyester are substantially insoluble, some of these drawbacks may be overcome. The viscous hydrocarbon, however, cannot be removed from the polyester by a simple flashing-off operation and is usually washed out with volatile solvents such as heptane, if an oil-free polyester is required. Traces of heptane remaining in the polyester after the washing step may be removed by evaporation.

Applicant has now found a polymerization method permitting, inter alia, lower diluent/lactone ratios such as, e.g., 2:1, and high bulk densities (0.3–0.6 and more) of the polyester obtained. In addition, the polymerization will proceed at a relatively higher speed while the thermostability of the polyester will, in general, be higher. As already indicated, the slurry method provides the additional advantage that low-boiling diluents may be used which may be flashed off and do not need to be washed out in an extra processing step.

The prepolymer initiators utilized in the present process and process for their preparation are disclosed and claimed in copending United States patent application, Ser. No. 717,472, filed Mar. 29, 1968, by William Bergwerf, Arie Klootwijk, and Willem M. Wagner.

SUMMARY OF THE INVENTION

This invention relates to a process for the polymerization of one or more beta-propiolactones, preferably at least 50 mol percent being pivalolactone (alpha, alpha-dimethyl-beta-propiolactone), in a liquid hydrocarbon diluent in a slurry-type process.

More particularly, the invention provides a process for preparing poly(beta-lactones) which comprises polymerizing one or more beta-propiolactones comprising, preferably at least 50 mole percent being pivalolactone, in a liquid hydrocarbon diluent having a boiling point below 300° C. in the presence of a solid carboxylate anion-containing initiator which is substantially insoluble in the diluent, is free of active hydrogen, has a molecular weight of between 200 and 10,000, and is prepared by reacting a beta-lactone with a nucleophilic agent in a molar ratio between 20:1 and 1:40.

DESCRIPTION OF THE PREFERRED EMBODIMENTS

The process of the instant invention is particularly applicable to the preparation of poly(beta-lactones) wherein special poly(beta-lactone) prepolymers are utilized as polymerization initiators. As noted hereinbefore, these prepolymers and their preparation are described in detail in copending United States patent application, Ser. No. 717,472, filed Mar. 29, 1968. These prepolymer initiators may have a betaine structure or they may not. It is essential that these prepolymer initiators be substantially free of active hydrogen since the "living" or active carboxylate-ion end of the prepolymer will be deactivated.

The process of the instant invention is particularly applicable for the polymerization of beta-lactones wherein the hydrogens of the beta-propiolactones having a tertiary or quaternary alpha-carbon atom are especially preferred. Excellent polymers are those prepared from alpha,alpha-dialkyl-beta-propiolactone wherein the alkyl groups contain from 1 to 4 carbon atoms. Suitable examples include alpha,alpha-dimethyl-beta-propiolactone, alpha - methyl-alpha-ethyl-beta-propiolactone, alpha - methyl-alpha-isopropoly-beta-propiolactone, alpha-ethyl-alpha-tert-butyl-propiolactone, alpha,alpha-diisopropyl-propiolactone, etc. Very good results were obtained in the homopolymerization of alpha,alpha-dimethyl-beta-propiolactone (pivalolactone).

The polyester which is the product of the present process is a linear polymer having recurring ester structural units mainly of the formula:

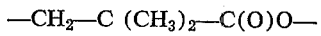

i.e., units derived from pivalolactone. Preferably the polyester is a pivalolactone homopolymer. Within the scope of the present invention, however, the copolymerization of pivalolactone with not more than 50 mole percent, preferably not more than 10 mole percent of other beta-propiolactones, such as beta-propiolactone, alpha,alpha-diethyl-beta-propiolactone and alpha-methyl-alpha-ethyl-beta-propiolactone, is most preferred.

The liquid hydrocarbon diluent, or at least 90% by weight of its components, has a boiling point (at atmospheric pressure) below 300° C., and preferably between −50 and 200° C., and more particularly, between 60 and 125° C. As used herein, "liquid" refers to the liquid state under the polymerization conditions. Preferred diluents are the saturated aliphatic and cycloaliphatic hydrocarbons such as pentane, heptane, cyclohexane, 1,4-dimethylcyclohexane, isooctane, aviation alkylate, and the like. With the lower alkanes, such as propane or butane superatmospheric pressure will usually be required.

The polymerization initiator is a solid which is substantially insoluble in the diluent, i.e., to an amount which is in practice too small to be measurable, but will, in general, be lower than 1% by weight.

The molecular weight of the initiators is generally below 10,000 and the prepolymers have, preferably, molecular weights of between about 1,000 and 8,000 whereas the betaine which is not of the prepolymer type has a molecular weight between about 100 and 300.

It will be appreciated that the solubility of the initiator is a function of its molecular weight. Prepolymer initiators having too low a molecular weight generally remain in solution to long and are too soluble therein. On the other hand, when the molecular weight of the prepolymer initiator becomes too high, its "life" or initiating activity is gradually lost. At molecular weights much above 10,000 said activity generally drops to an unattractively low level.

It is known that pivalolactone may be polymerized in hydrocarbon diluents in the presence of nucleophilic agents, e.g., tertiary phosphines or amines or phosphonium or ammonium compounds. See, for example, British Pats. 1,028,928 and 1,046,994. From this prior art it could not be deduced; however, that the use of the above prepolymer initiators provide the advantages herein exhibited.

During the polymerization of pivalolactone with e.g., tetrabutylphosphonium bromide or triphenyl phosphine, a prepolymer having a molecular weight between 200 and 10,000, will be formed as an intermediate, presumably according to the equations:

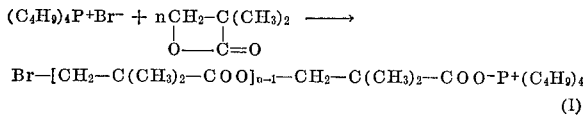

(I)

and

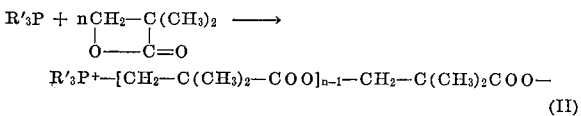

(II)

wherein R' represents an alkyl or aryl radical such as a phenyl or a butyl radical.

As a first step in the polymerization, initiation occurs between one molecule each of nucleophilic agent and pivalolactone so as to form a carboxylate anion-containing adduct, followed by propagation by further additions of pivalolactone to the carboxylate anion. Now with pivalolactone, the propagation is so much faster than the initiation, that the lower-molecular-weight prepolymers have little chance of precipitating. It is believed that by this propagation upon "living" prepolymers which are still in solution, low bulk densities and other disadvantages of the prior art methods result. On the other hand, if the low-molecular-weight prepolymer is allowed to precipitate first as a solid, then further propagation thereupon will result in the advantages according to the present invention. Preformed betaines, e.g., $$(CH_3)C_{3'}{}^+CH_2COO^-$$

are, as such, already sufficiently insoluble in the diluent, thereby enabling heterogeneous propagation upon lower-molecular-weight carboxylate anion-containing initiators which is believed to be the theory of the operation of the present process. This explanation, however, should be considered as only a tentative one.

The prepolymers which may or may not be betaines may be considered as inner salts having in the molecule a carboxylate anion: $-C(O)O^-$ and "nium" cation such as, e.g., $R_3N^+-$, ammonium,

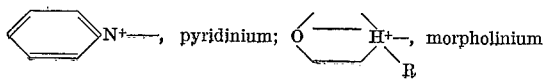

$R_3P^+-$, phosphonium, $R_3As^+-$, arsonium; $R_3Sb^+-$, stibonium; and $R_2S^+-$, (in which R designates an organic radical or in which 2 R's may form a ring structure). Examples of suitable preformed initiators which are not prepolymers, are the inner salts of (carboxymethyl)trimethylammonium or ordinary betaine:

$$(CH_3)_3N^+CH_2COO^-$$

(2-carboxyethyl)pyridinium, (1-carboxyundecyl)trimethylammonium, (1 - carboxyethyl)tributylphosphonium, (carboxymethyl)dimethylsulfonium and 3 - carboxy-1-methylpyridinium.

Preferred initiators; however, are the prepolymers which may or may not be betaines, dependent upon the type of nucleophilic agent used in the reaction with the beta-lactone. If tertiary phosphines, stibines, arsines, amines or sulfides or sulfoxides are used as the nucleophilic agent, then, upon reaction with a beta-lactone, a prepolymer will result, e.g., as indicated by the above Equation II.

If, on the other hand, an alkali metal salt of an organic or inorganic acid, an alkali metal hydroxide, -hydrosulfide, -phenolate, -thiophenolate, -alcoholate or -mercaptide, an alkali metal alkyl or aryl, a quaternary phosphonium, stibonium, arsonium, ammonium or a tertiary sulfonium salt of an organic or inorganic acid is used as nucleophilic agent, a prepolymer which is not a betaine may be formed, e.g., as indicated by the above Equation I. Prepolymer-initiators which are prepared from tertiary phosphines, stibines and arsines are preferred in view of the higher themostability of the resulting polyesters.

Examples of suitable nucleophilic agents are lithium bromide, potassium iodide, sodium acetate, sodium stearate, potassium pivalate, sodium hydroxide, lithium hydrosulfide, potassium creolate, dibutylsulfide, dimethyl sulfoxide, trimethylsulfonium iodide, trimethylamine, tetramethylammonium laurate, tributylphosphine, triphenyl arsine, methyldiethyl stibine, tetrabutylphosphonium bromide, lithium butyl, sodium naphthalene and the like. Preferred nucleophilic agents are the tertiary phosphines, stibines and arsines.

Preferably, the prepolymers which are useful in the present process are prepared from beta-lactone wherein the hydrogen of the beta-lactones having a tertiary or quaternary alpha-carbon atom are especially preferred. Excellent prepolymer initiators are those prepared from alpha, alpha-dialkyl-beta propionlactone wherein the alkyl groups contain from 1 to 4 carbon atoms.

Suitable examples include alpha,alpha-dimethyl-beta-propiolactone, alpha-methyl-alpha-ethyl-beta-propiolactone, alpha-methyl-alpha-isopropoly-beta-propiolactone, alpha-ethyl-alpha-tert-butyl-proiolactone, alha-alha-diisopropyl-propiolactone, etc.

Thus the preferred beta-lactones have the general formula:

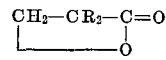

wherein R is an alkyl group containing up to 4 carbon atoms. An especially preferred beta-lactone is pivalolactone (alpha,alpha-dimethyl-beta-propiolactone).

In order to obtain the prepolymer, the alpha,alpha-dialkyl-beta-propiolactone and nucleophilic agent are reacted in a molar ratio between 20:1 and 1:40, preferably between 4:1 and 1:10. Advantageously, the lactone is added to the nucleophilic agent so as to ensure that at any time during the reaction the molar ratio will not be too high.

The reaction is suitably carried out in a liquid, inert diluent, though gaseous diluents may be used, if desired, e.g., in a fluid-bed-type reactor. As used herein, the term "liquid" refers to the liquid state under the reaction conditions. Suitable diluents include, for example, hydrocarbons, ethers, esters, and halogenated hydrocarbons. It should be remembered, however, that strongly basic nucleophilic agents, such as NaOH, may not be inert towards esters and halogenated hydrocarbons. Preferred diluents are the hydrocarbons boiling below 300° C. at atmospheric pressure.

The reaction between the lactone and the nucleophilic agent is generally carried out at temperatures between 0 200° C., preferably between 10 and 150° C.

If liquid diluents, in particular liquid hydrocarbons, are used in the reaction, the prepolymer will usually separate therefrom after some time by precipitation in the form of a fine powder. It is usually necessary to allow the reaction mixture to stand for at least 5 to 60 minutes after the addition of the reaction components so as to have the prepolymer separated as completely as practically possible. The reaction mixture may be gently stirred during this period. Thereupon the prepolymer may be filtered, centrifugated, decanted, spray-dried or the like, and may subsequently be washed, if desired, e.g., with a volatile solvent, such as pentane. Washing is more desirable if the prepolymer is not a betaine. If in certain solvents, such as esters or halohydrocarbons, the solubility of the prepolymer is too high, precipitation may be promoted by addition of suitable ethers or liquid hydrocarbons. The reaction mixture from which the prepolymer has precipitated may be used as such, though it is preferable to separate the prepolymer from the diluent used in the reaction.

Water and other protic solvents such as alcohols, phenols, acids, and the like are undesirable although minor amounts of water or alcohols, e.g., up to 5% w., may be tolerated in the reaction mixture.

The amount of carboxylate anion-containing initiator to be used in the polymerization according to the invention is generally between 0.01 and 10% by weight, preferably between 0.1 and 2% by weight, based on the monomers. The temperature at which polymerization takes place will, most often, be between 0 and 150° C., and preferably between 60 and 100° C. The weight ratio of monomer to hydrocarbon diluent may be as high as 1.0 and is preferably from 0.2 to 0.7.

The polyesters obtained according to the invention are suitable for numerous applications, such as the manufacture of threads, fibers and films and for the molding of objects.

EXAMPLE I (a) A prepolymer initiator was prepared by adding 10 g. (0.1 mole) of pivalolactone to a boiling solution of 157 g. (0.6 mole) of triphenylphosphine in 540 ml. of 1,2-dimethoxyethane. The mixture was refluxed for 1¾ hours. After cooling to room temperature, the prepolymer was filtered, washed with ether, and dried, The yield was 8.5 g., and the phosphorus content was 0.36%, corresponding to a molecular weight of 8,600. The molecular weight determined with the aid of gel permeation chromotography was 7,200.

(b) To a stirred suspension of 1 g. of the prepolymer prepared above in 200 ml. of aviation alkylate (boiling point 100° to 170° C.), 100 g. of pivalolactone were added dropwise at 100° C. for 2 hours. The mixture was kept at 100° C. for 18 hours. Filtration yielded 88 g. of polymer, bulk density 0.40 g./ml., intrinsic viscosity 4.3 dl./g. (measured in trifluoroacetic acid at 25° C.). No reactor fouling occurred and no difficulties with stirring of the polymerization mixture were encountered.

(c) When under the same conditions a comparative polymerization experiment was undertaken in which the prepolymer initiator was replaced by 1 g. (0.004 moles) of triphenyl phosphine, the viscosity of the reaction mixture became too high for stirring after 3–4 hours, preventing adequate working up. In order to obtain a stirrable reaction mixture, the amount of pivalolactone had to be reduced from 100 g. to 15 g. Under the same conditions (employing 150 mg. of triphenylphosphine), a polymer resulted having a bulk density of 0.1 g./ml. and an intrinsic viscosity of 0.4 dl./g. The stirrer and reactor walls were covered with polymer which could only be removed with difficulty.

EXAMPLE II

Under the same conditions as described in Example I(b), an experiment was carried out in which all the lactone was added to the reaction system at the start. After 20 hours the yield of polymer was 94 g., bulk density was 0.29 g./ml., and the intrinsic viscosity was 5.9 dl./g.

EXAMPLE III (a) To a solution of 60.6 g. (0.3 mole) of tributyl phosphine in 180 ml. of dimethoxyethane, 30 g. (0.3 mole) of pivalolactone were added at room temperature, after which the mixture was stirred for 3 hours. After storing overnight at −10° C., 30 g. of prepolymer were filtered off, having a phosphorous content of 0.49% w., which corresponds to a molecular weight of 6,300.

(b) To a stirred suspension of 1 g. of this prepolymer in 200 ml. of aviation alkylate were added dropwise for 2 hours 100 g. of pivalolactone at 100° C. After 20 hours total reaction time, the polymer was filtered. The yield was 100 g., the bulk density was 0.42 g./ml., and the intrinsic viscosity was 4.3 dl./g.

EXAMPLE IV

To a slurry of 0.25 g. of the prepolymer described in Example III(a) in 200 ml. of aviation alkylate were added at 80° C. for 1 hour 100 g. of pivalolactone. The total reaction time was 20 hours. Filtration of the product yielded 95 g. of polymer with a bulk density of 0.39 g./ml. and an intrinsic viscosity of 4.7 dl./g.

EXAMPLE V (a) To a boiling solution of 1.4 g. of anhydrous potassium pivalate in 90 ml. of dimethoxyethane 10 g. (0.1 mole) of pivalolactone were added. The mixture was refluxed for 2 hours and cooled to room temperature, yielding 4 g. of prepolymer.

(b) To a slurry of 1 g. of this product in 200 ml. of aviation alkylate, 100 g. of pivalolactone were added in 2 hours at 100° C. After 20 hours total reaction time, filtration yielded 83 g. of polymer having a bulk density of 0.68 g./ml. and an intrinsic viscosity of 1.50 dl./g.

EXAMPLE VI (a) The prepolymer was prepared by adding at room temperature, 9.3 g. of pivalolactone to a solution of 15.8 g. of tetrabutyl phosphonium bromide in 84 ml. of dimethoxyethane. The mixture was stirred for 80 minutes, stored overnight at −10° C. and filtered. Yield: 14.7 g. of prepolymer having a molecular weight of 420 as determined by the vapor pressure method.

(b) Following the method described in Example V(b), pivalolactone was polymerized with this prepolymer. Yield: 92 g.; bulk density: 0.19; intrinsic viscosity: 3.2 dl./g.

EXAMPLE VII (a) To a boiling solution of 92.5 g. (0.5 mole) of tri-n-butylamine in 95 ml. of dimethoxyethane, 10 g. (0.1 mole) of pivalolactone were added. The mixture was refluxed for 1 hour, cooled to room temperature and filtered. Yield of prepolymer: 5 g.; nitrogen content: 0.39%, which corresponds to a molecular weight of 3,600.

(b) Following the method of Example V(b), pivalolactone was polymerized with this prepolymer. Yield: 40 g. of polymer; bulk density: 0.40 g./ml.; intrinsic viscosity: 2.4 dl./g.

EXAMPLE VIII (a) Addition of 30 g. (0.3 mole) of pivalolactone to a boiling solution of 2.6 g. (0.03 mole) of LiBr in 270 ml. of dimethoxyethane, reflux for 1 hour, overnight storage at −10° C. and filtration yielded 4.9 g. of prepolymer, molecular weight: 1,830 (vapor pressure method).

(b) Polymerization with this prepolymer as described in Example V(b) resulted in 18 g. of polymer having a bulk density of 0.38 g./ml. and an intrinsic viscosity of 0.25.

EXAMPLE IX (a) A solution of 26.3 g. (0.1 mole) of triphenylphosphine and 8.35 g. (0.012 mole) of beta-propiolactone in 90 ml. of 1.2-dimethoxyethane was refluxed for 2.5 hours. After standing overnight, 6.5 g. of prepolymer having a molecular weight of 1,900, were obtained.

(b) Polymerization of pivalolactone with this prepolymer as described in Example V(b) yielded 96 g. of polymer having a bulk density of 0.32 g./ml. and an intrinsic viscosity of 5.3 dl./g.

EXAMPLE X

A mixture of 505 mg. (2.5 moles) of tributylphosphine, 0.25 g. (0.25 mmole) of pivalolactone and 20 ml. of aviation alkylate were heated to the boiling point and refluxed for 1 hour, after which the prepolymer had precipitated.

Then 280 ml. of aviation alkylate were added to the reaction mixture, the temperature was brought to 60° C. and 100 g. of pivalolactone were added for 2 hours. After a total reaction time of 3 hours, the polymer was filtered to give 95 g. of product having an intrinsic viscosity of 2.2 dl./g. and a bulk density of 0.28 g./ml.

We claim as our invention:

1. A process for polymerizing beta-lactones with the aid of prepolymer initiators which comprises:
   (1) adding (a) a solid preformed carboxylic anion-containing initiator which is substantially insoluble in the diluent, is free of active hydrogen, has a molecular weight below 10,000 and is prepared by reacting a beta-lactone with a nucleophilic agent which is free of active hydrogen selected from the group consisting of $R'_3P$, $R'_3As$ and $R'_3Sb$ wherein $R'$ is an alkyl or aryl radical, in the molar ratio of beta-lactone to nucleophilic agent of between 4.1 and 1:10 to (b) a beta-lactone, and
   (2) polymerizing the beta-lactone in a liquid hydrocarbon diluent having a boiling point below 300° C.

2. A process as in claim 1 wherein the beta-lactones polymerized have the general formula

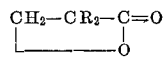

wherein R is an alkyl group containing 1 to 4 carbon atoms or hydrogen.

3. A process as in claim 2 wherein at least 90 mole percent of the beta-lactones to be polymerized is pivalolactone.

4. A process as in claim 3 wherein pivalolactone is homopolymerized.

5. A process as in claim 1 wherein the initiator has been obtained by reacting the nucleophilic agent with a beta-lactone having the general formula

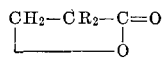

wherein R is an alkyl group containing 1 to 4 carbon atoms or hydrogen.

6. A process as in claim 1 wherein the prepolymer initiator has a molecular weight between 100 and 300.

7. A process as in claim 1 wherein the prepolymer initiator has a molecular weight between 1,000 and 8,000.

8. A process as in claim 1 wherein the hydrocarbon diluent is a saturated aliphatic or cycloaliphatic hydrocarbon.

9. A process as in claim 1 wherein the hydrocarbon diluent has a boiling point between 50 and 200° C.

10. A process as in claim 1 wherein the initiator is used in an amount between 0.1% and 2% by weight based on the monomers.

11. A process as in claim 1 wherein the polymerization is performed at a temperature between 60 and 100° C.

12. A process as in claim 1 wherein the weight ratio of monomer to hydrocarbon diluent is 0.2 to 0.7.

13. A process as in claim 1 wherein the tertiary phosphine is triphenyl phosphine.

References Cited

FOREIGN PATENTS

| 766,347 | 1/1957 | Great Britain | 260—78.3 |
| 1,016,394 | 1/1966 | Great Britain | 260—78.3 |
| 1,017,669 | 1/1966 | Great Britain | 260—78.3 |
| 1,128,137 | 9/1968 | Great Britain | 260—78.3 |
| 791,524 | 4/1960 | France | 260—78.3 |
| 736,566 | 4/1966 | Canada | 260—78.3 |

WILLIAM H. SHORT, Primary Examiner

E. A. NIELSEN, Assistant Examiner

U.S. Cl. X.R.

260—484, 823

PO-1050
(5/69)

UNITED STATES PATENT OFFICE
CERTIFICATE OF CORRECTION

Patent No. 3,558,572          Dated January 26, 1971

Inventor(s) FRANCISCUS J. F. VAN DER PLAS and WILLEM M. WAGNER

It is certified that error appears in the above-identified patent and that said Letters Patent are hereby corrected as shown below:

Column 1, line 23, "stifines" should read -- stibines --.

Column 4, line 43, "beta-lactone" should read -- beta-lactones --;

column 4, line 27, "propionlactone" should read -- propiolactone -- column 4, line 52, "alha-alha" should read -- alpha,alpha --.

Column 7, line 41, "4.1" should read -- 4:1 -- in claim 1.

Signed and sealed this 4th day of May 1971.

(SEAL)
Attest:

EDWARD M. FLETCHER, JR.          WILLIAM E. SCHUYLEI
Attesting Officer          Commissioner of Pa1